United States Patent [19]

Gilden

[11] 4,349,400

[45] Sep. 14, 1982

[54] METHOD FOR MANUFACTURING TWO-PIECE CONTAINERS FROM FILLED THERMOPLASTIC SHEET MATERIAL

[75] Inventor: Morton Gilden, Baltimore, Md.

[73] Assignee: Maryland Cup Corporation, Owings Mills, Md.

[21] Appl. No.: 2,606

[22] Filed: Jan. 11, 1979

Related U.S. Application Data

[62] Division of Ser. No. 795,618, May 10, 1977, Pat. No. 4,299,349.

[51] Int. Cl.³ .............................................. B29D 23/10
[52] U.S. Cl. ...................................... 156/217; 493/109; 493/134; 156/218; 156/290; 156/499; 229/1.5 B; 229/3.5 R
[58] Field of Search ............... 156/217, 218, 290, 466, 156/497, 499; 93/36.1, 36.05, 36.2, 39.1, 39.2, 39.3; 229/1.5 B, 3.5 R

[56] References Cited

U.S. PATENT DOCUMENTS

| | | | |
|---|---|---|---|
| 2,992,958 | 7/1961 | Yamaguchi | 156/290 |
| 2,999,042 | 9/1961 | Meister | 156/290 |
| 3,028,798 | 4/1962 | Allen | 93/39.1 R |
| 3,343,465 | 9/1967 | Albert | 93/39.3 |
| 3,673,033 | 6/1972 | MacDaniel et al. | 156/217 |
| 3,847,540 | 11/1974 | Farfaylia et al. | 156/497 |
| 4,070,513 | 1/1978 | Rhoads | 156/290 |

Primary Examiner—Caleb Weston
Attorney, Agent, or Firm—Birch, Stewart, Kolasch & Birch

[57] ABSTRACT

A method and apparatus are provided for forming two-piece drinking cups and containers from conventionally shaped arcuate sidewall blank and bottom blanks of filled polypropylene sheet material or polypropylene-polyethylene copolymer sheet material with approximately 40% talc or calcium carbonate as a filler. The arcuate blanks for the sidewall and the bottom blanks are run through relatively standard two-piece container or cup making machinery utilizing patterned air jet heating means to heat areas of the filled plastic sheet material such that the sidewall and bottom curl seams can be heat sealed on the forming mandrels of the machinery and the top curl can be placed in the container by heating and substantially conventional forming dies. The seaming structures so produced are extremely water tight and of high strength characteristics.

14 Claims, 16 Drawing Figures

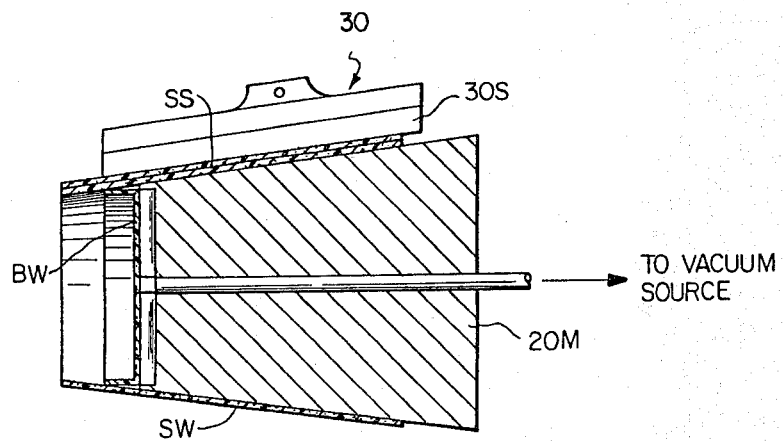
FIG. 4B
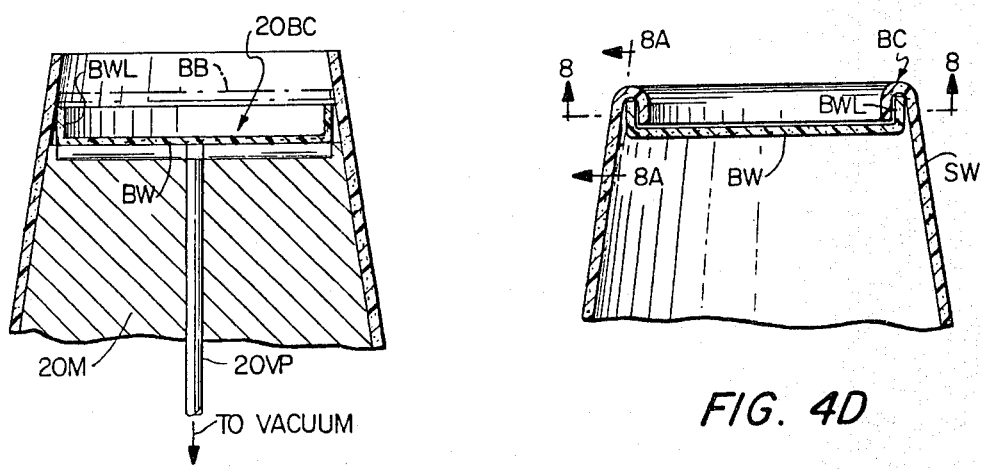
FIG. 4C
FIG. 4D
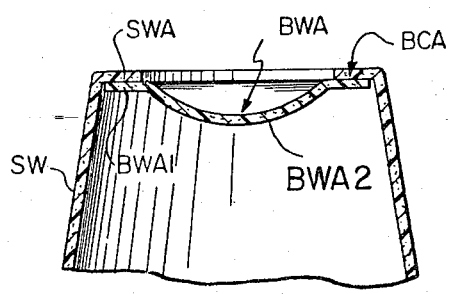
FIG. 4E

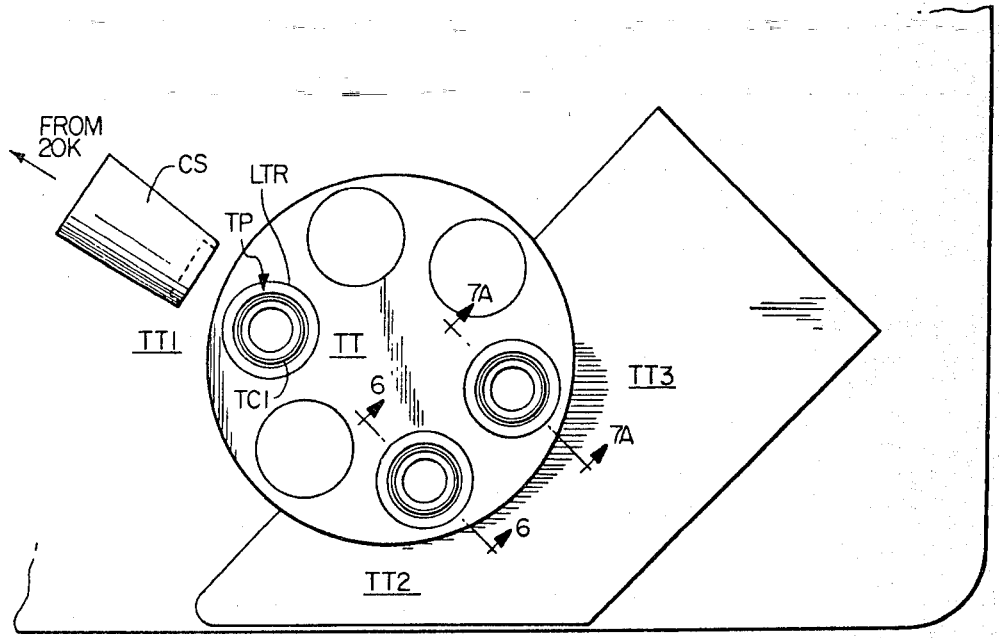
FIG. 5
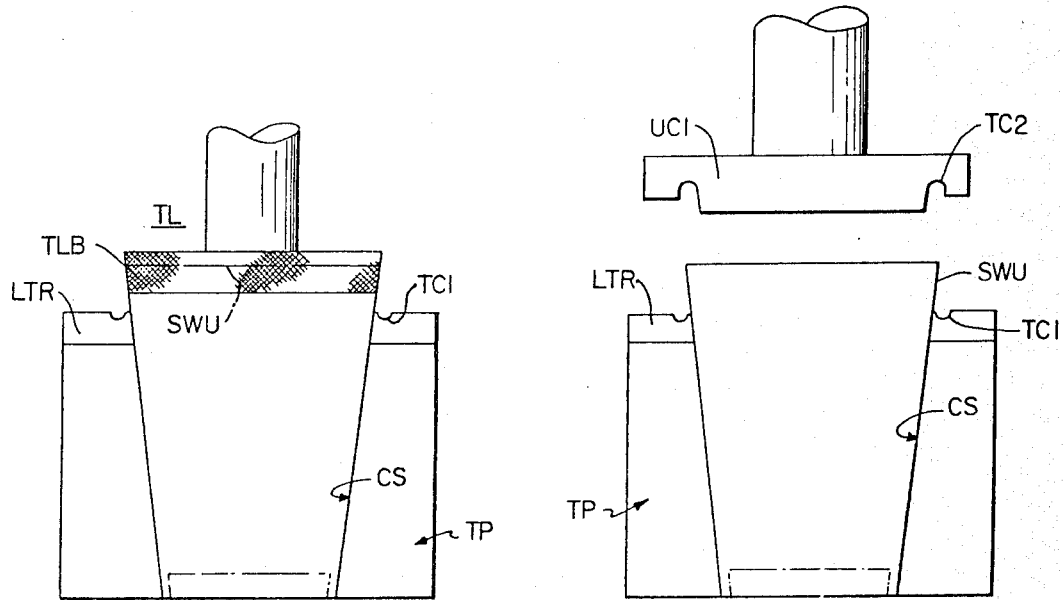
FIG. 6
FIG. 7A

METHOD FOR MANUFACTURING TWO-PIECE CONTAINERS FROM FILLED THERMOPLASTIC SHEET MATERIAL

This application is a divisional of copending application Ser. No. 795,618, filed on May 10, 1977, U.S. Pat. No. 4,299,349.

FIELD OF THE INVENTION

This invention relates to the manufacture of two-piece containers such as drinking cups and food tubs from thermoplastic sheet material having a relatively large amount of inorganic filler material therein.

BACKGROUND OF THE INVENTION

In the normal manufacture of two-piece containers such as drinking cups and food tubs from paper or cardboard sheet, there are a number of disadvantages which are inherent in this material even though the material readily adapts itself to higher machine speeds in view of the fact that it will lie flat on a carrier in the machine, is readily deformable and holds printing very well. Also, polyethylene coated on paper can be utilized so as to provide a heat sealed seam in the sidewall of the container and around the bottom curl of the container. Normally, without such laminations, however, single sheets of material are either too expensive or do not have satisfactory heat sealable characteristics. Paper and cardboard materials, both coated and uncoated, suffer from wicking at the cut edges of the side seam such that if liquid or liquid containing foods are placed within such containers, there is a general deterioration of the side seam edge. Furthermore, such two-piece containers in the past have been usable for alcoholic beverages in the case where wicking is prevalent or sealing the paper or cardboard sheet with was is necessary in the general manufacture of such containers since the alcohol destroys the wax seal.

Accordingly, there is a need in the art for containers of material which print, form and handle like paper but which have the following additional characteristics;

1. High resistance to penetration by grease and resistance to moisture;
2. Do not wick at cut edges such as at the side seam;
3. Are thermoformable, and preferably, upsettable and flowable to form substantially solid seams by heat sealing;
4. Can be preprinted like paper containers prior to forming;
5. Form like paper into containers from flat blanks at substantially high machine speeds;
6. Have the capability of being provided with a mat or gloss finish selectively;
7. Are heat sealable; and
8. Can be used without additional coating materials such as a layer of wax or polyethylene without being damaged by alcoholic beverages, hot beverages or the like.

It is therefore an object of the present invention to provide a new and novel two-piece container for drinking cups and food cups.

It is another object of the present invention to provide a new and novel method of manufacturing two-piece drinking cups and food cups.

Still another object of the present invention is to provide a new and novel heat sealed thermoplastic two-piece drinking cup and food cup structure.

Yet another object of the present invention is to provide new and novel method and means for forming uniform liquid tight heat sealed seams in thermoplastic sheet materials.

Yet another object of the present invention is to provide a method and means for manufacturing two-piece thermoplastic containers such as drinking cups and food cups from filled thermoplastic sheet material on substantially conventional container making equipment.

These and other objects of the present invention will become more fully apparent with reference to the following specification and drawings which relate to a preferred embodiment of the present invention.

SUMMARY OF THE INVENTION

Filled thermoplastic sheet material for example, polypropylene or polypropylene-polyethelene copolymer having approximately 40% talc or calcium carbonate as a filler, in sheets on the order of 5-20 mils in thickness, is cut into arcuate cup blanks as is well known in the two-piece container art as well as into bottom forming discs which is also conventional in the paper cup making and two-piece container art and the two items are combined with a side seam in the sidewall blank and a bottom curl joining the sidewall and bottom blanks, both the sidewall seam and the bottom curl being heat sealed to preclude leakage and provide a permanent construction to the container. The open upper end of the container is provided with a top curl to finish the container structure.

The side seam and bottom curl are heat sealed by first exposing the overlapping areas involved therein to a plurality of jets of heated air sufficient to cause the thermoplastic filled sheet material to soften and then conventional seam clamps are utilized to seal the side seam with suitable mechanical pressure and a bottom curl tool is utilized to turn the bottom curl end over the formed bottom blank to effectuate a final heat seal of the bottom curl to the bottom blank. All of the folding and seaming operations take place around or on frusto conical mandrels on substantially conventional paper cup or container making machinery which has been primarily designed for use with polyethylene coated paper and the like.

BRIEF DESCRIPTION OF THE DRAWINGS

FIG. 4B is a schematic cross-section taken along line 4B—4B of FIG. 3;

FIG. 4C is a schematic cross-section of a container sidewall and a preferred bottom structure embodiment on a forming mandrel in the process of the present invention;

FIG. 4D is a schematic cross-section of a substantially completed bottom curl from the embodiment of FIG. 4C;

FIG. 4E is a schematic cross-section of another preferred embodiment of bottom curl structure of the present invention;

FIG. 5 is a schematic top plan view of a top curl forming station of the present invention;

FIG. 6 is a schematic cross-section taken along line 6—6 of FIG. 5;

FIG. 7A is a schematic cross-section taken along line 7—7 of FIG. 5;

DETAILED DESCRIPTION OF THE DRAWINGS

Figure 1:
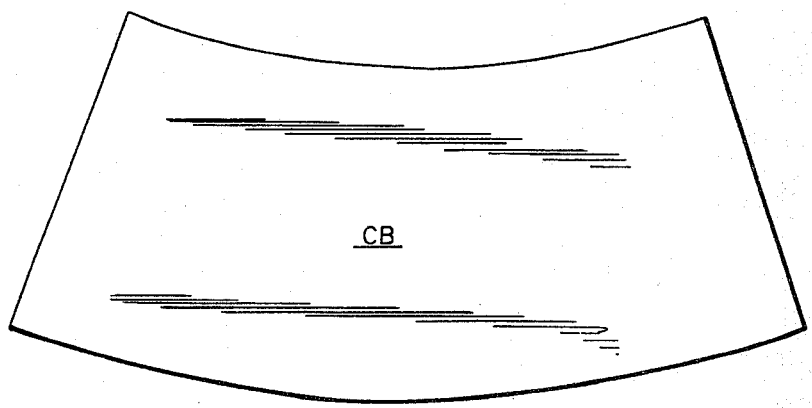
FIG. 1 is a top plan view of a sidewall blank of the present invention.
Figure 2:
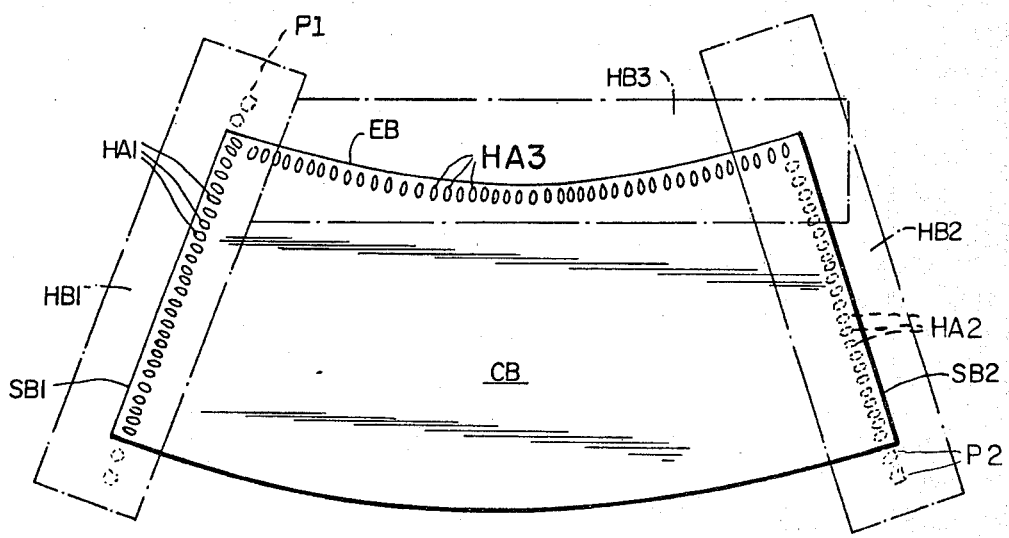
FIG. 2A is a schematic top plan view of a sidewall blank at a heating station.
FIG. 2B is a schematic perspective of the sidewall blank and heating means of FIG. 2A.

Referring in detail to the drawings, and with particular reference to FIGS. 1 and 2, a conventional arcuate container sidewall blank CB is cut from a sheet of thermoplastic material. This material, in a preferred embodiment of the present invention is polyolefin sheet material comprised of polypropylene and/or other polyolefin with approximately 40% talc filler and one or two percent pigment, by weight. As shown, the blank CB is being indexed into position adjacent a plurality of heater bars comprising first and second air heater bars HB1 and HB2, the latter being parallel to the end defining edges SB1 and SB2 of the arcuate blank CB and a third arcuate pattern air heater bar HB3 which is adjacent the arcuate smaller or bottom edge EB of the container blank CB.

The first air heater HB1 is located above the side edge SB1 of the container blank CB and directs a plurality of closely spaced jets of heated air downward through the ports P1 to form a corresponding plurality of heated areas HA1 along the upper surface of the blank CB adjacent the said edge SB1.

The second air heater HB2 is located beneath the other side edge S2 of the blank CB and directs jets of heated air upward from the ports P2 into impingement with the lowermost surface of the blank CB to form a corresponding plurality of heated areas HA2 adjacent the said edge SB2 on the said lower surface of the blank CB.

Thus, the first and second heaters HB1 and HB2 provide line patterns of heat softened areas HA1 and HA2 which act, when the blank CB is folded to form a side seam comprised of the overlapped edges SB1 and SB2, to effect a pressure responsive heat seal at the said side seam as will be hereinafter more fully described.

The use of discrete heated areas in preselected patterns permits retention of sufficient material strength in the areas to be seamed and heat sealed so that distortion of the heated areas is precluded. Additionally, the discrete heated areas HA1, HA2 and HA3 are interspersed with areas softened to a lesser extent to provide this strength while still being heat sealable to provide a liquid tight seam.

Figure 4A:
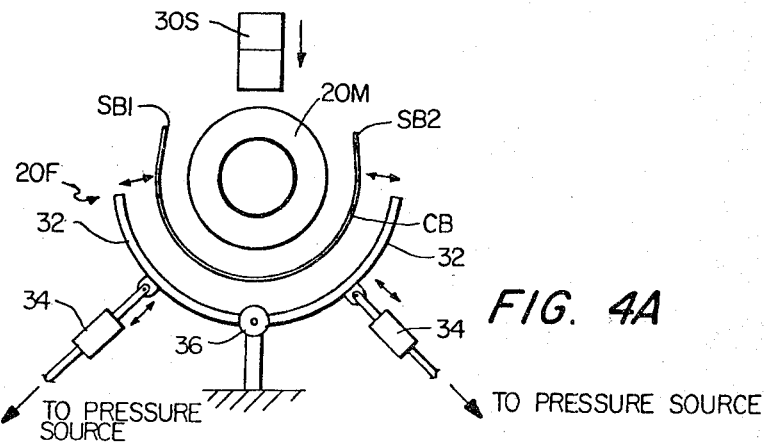
FIG. 4A is an end view of a clamping station of the present invention.
Figure 3:
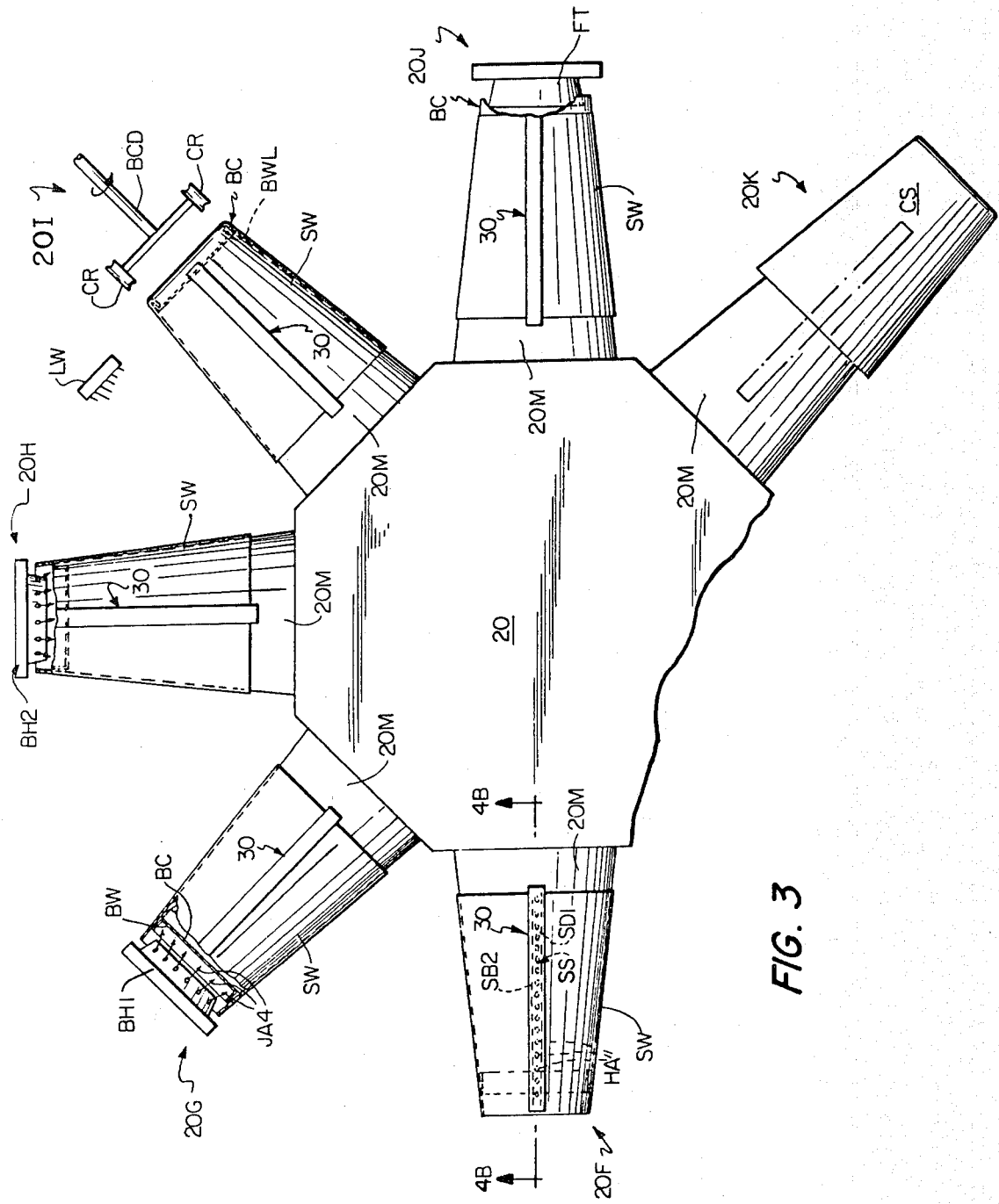
FIG. 3 is a schematic top plan view of a tunnel type machine illustrating the various steps of forming the sidewall of a container of the present invention.

Referring to FIGS. 3, 4A and 4B, the container blank CB with the patterns of heated areas HA1, HA2, HA3 thereon is transferred by conventional conveying means to a folding and clamping station 20F on a machine turret 20 about which are spaced a plurality of radially disposed, peripherally mounted, frusto conical mandrels 20M which are in the shape of the finished sidewall SW of a container into which the container blank CB is to be incorporated.

Figure 9:
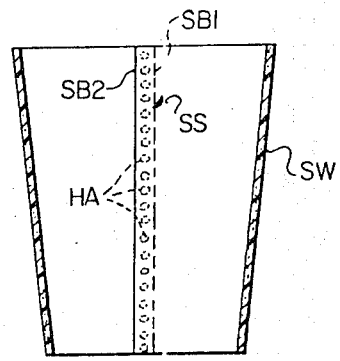
FIG. 9 is a schematic cross-section; illustrating the side seam structure of a container sidewall of the present invention.

Referring additionally to FIG. 9, a vertical cross section of a finished sidewall SW with a lapped side seam SS is illustrated, with now fused heated areas HA defined along the side seam SS between the laps of the sidewalls SB1 and SB2 to form a heat sealed side seam.

This heat sealing is achieved at the folding and clamping station 20F by a seam clamp 30 which includes an elongated clamping shoe 30S which extends the entire length of the sidewall along the overlapped side edges SB1 and SB2 to apply sufficient pressure against the mandrel 20M to complete the heat sealing of the side seam SS after the folding shoes 32 have caused the blank CB to assume the shape of the mandrel 20M as best illustrated in FIG. 4A. The folding shoes 32 are conformally shaped which engage the blank CB and fold it around the mandrel 20M by means of suitable two-way pressure actuated power pistons 34 or the like driving the said shoes 32 about a common hinge 36.

The blank CB is oriented so that the first side edge SB1 is externally lapped over the second side edge SB2 so that the fused heated areas HA in the side seam SS will result from a merging of the thus opposed heated areas HA1 and HA2 under the pressure of the seam clamp 30.

Referring additionally to FIG. 4C, disc shaped bottom blanks BB of the same or lesser gauge filled sheet material are supplied to the bottom of the mandrel 20M at a suitable work station such as the folding and seaming station 20F and are bridged across a substantially cylindrical bottom cavity 20CB in the base of the mandrel 20M where it is retained by vacuum from vacuum ports 20VP or other suitable means associated with the mandrel 20M. Alternatively, the blank BB can be inserted into the cavity 20CB by a suitable plunger or the like (not shown) as is generally known in the art.

As illustrated in FIG. 3, the turret 20 indexes each mandrel 20M through successive stations 20G, 20H, 20I, 20J and 20K which have the following work functions:

Station 20G—First heating and initial conforming of the bottom blank BB into the shap of the bottom cavity 20CB to provide bottom wall shape BW.

Station 20H—Heating of annular lip of bottom wall BW to prepare for subsequent bottom curling and seaming operation.

Station 20I—Bottom curl initiating station and partial sealing.

Station 20J—Bottom curl sealing and finishing station.

Station 20K—Container ejection and transfer to top curl forming turret.

A conventional finished bottom curl BC is illustrated in FIG. 4D as one preferred embodiment of a container of the present invention.

Because of the strength of the heat sealed seams and the non-wicking characteristics of the filled thermoplastic material in the finished containers, another preferred embodiment of bottom wall BWA is shown in FIG. 4E, having an annular peripheral skirt portion BWA1 and a domed central portion BWA2 which is heat sealed about the skirt BWA1 with an inturned annular flanged SWA of the sidewall SW to provide an alternative bottom curl structure BCA.

In further explanation of the fabrication of a complete container from the blanks CB and BB, the formed sidewall SW with the bottom blank BB either in the bottom wall shape BW or in the bridged dotted line position of FIG. 4C are shifted with the second work station 20G where a first bottom heater BH1 is brought into proximity with the bottom blank BB (or basically formed bottom wall BW as the case may be) and the small (bottom) end of the sidewall SW such that jets of air JA4 are impinged upon the interior of the peripheral flange BWL of the bottom wall BW which, as described, will either have been vacuum formed into the bottom cavity BC at this time or has already been pressed into place by a suitable plunger means as generally known in the art.

Also, it should be understood that the bottom cavity BC may be shaped to conform to the skirt BWA1 and dome BWA2 of the alternate bottom wall BWA and that the skirt BWA1 is heated on its outer surface.

In both instances, the interior portion of the sidewall SW still bears the line of heated areas HA3 which are maintained in a softened state by the applied heat of the air jets JA4 from the first bottom heater BH1.

Because there are two laminates in the bottom curl BC of the embodiment of FIG. 4D, (a conventional paper cup or food tub type bottom curl) there are two bottom heating stations to insure sufficient heating of the sidewall areas HA3 and the interior surface of the annular flange BWL on the bottom wall BW for making an effectively heat sealed, liquid proof bottom curl.

The third work station 20H includes a second bottom heater BH2 which provides the extra measure of heat over the next dwell period of the turret 20 to insure sufficient softening of the sealable surfaces.

The next step of the turret conveys the mandrel 20M at the station 20H to the bottom curl initiating station 20I past a lubricating wick LW or other suitable means which is engaged by the lowermost portion of the lapped side seam SS between the outer end of the sidewall blank SW and the outer end of the seam clamp 30 to enhance the ability of the curling rollers CR on the rotating bottom curling device BCD to initiate the bottom curl BC by curling the other end of the sidewall SW inward over the lip BWL of the bottom wall as further illustrated by FIGS. 4C and 4D.

The next index of the turret 20 takes the mandrel 20M with the partially completed bottom curl BC to the curl finishing station 20J where a finishing and expanding tool FT cooperates with the outer end of the mandrel 20M as is generally known in the cup making art to complete the bottom curl BT to render it uniform and liquid tight.

One more indexing of the turret 20 results in the now finished container shell CS being ejected at ejection station 20K such as by positive pneumatic pressure through the internal vacuum ports 20VP of the mandrel 20M to blow the shell CS radially outward and into a suitable receptacle such as the top ending pot TP in the top ending turret TT shown in FIGS. 5, 6, 7A, 7B and 7C.

Referring to those Figures, the container shell CS is rotated from the loading position TT1 to a lubricating station TT2 by suitable indexing of the turret TT and a cam operated lubricating tool TL having a frusto conical brush TLB thereon conforming to the shape of the upper sidewall SWU is engaged with the latter to apply a suitable lubricant such as FDA approved mineral oil or the like to the internal walls of the upper sidewall SWU to enhance the top curling action theeof as will now be described.

Figure 7B:
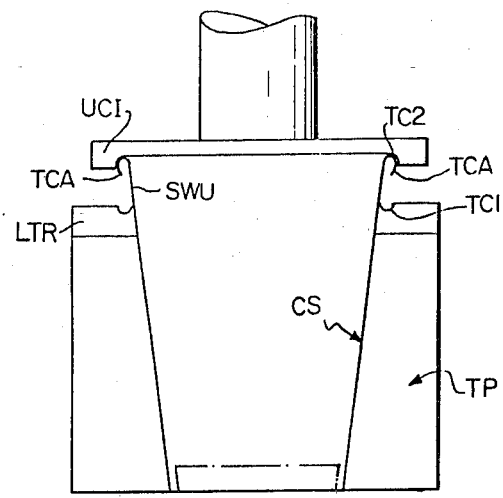
FIG. 7B is a cross-section illustrating a next method step from FIG. 7A.
Figure 7C:
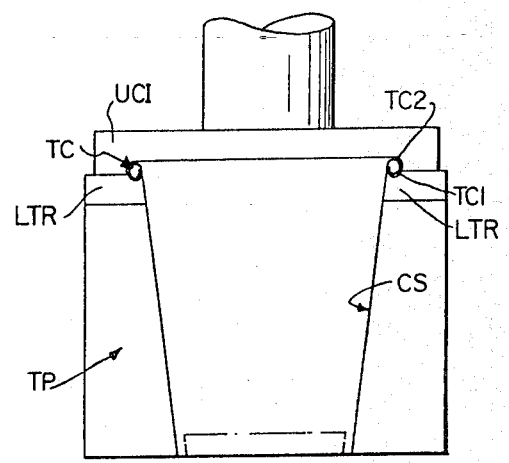
FIG. 7C is schematic cross-section illustrating a next consecutive method step from FIG. 7B.

The turret TT advances to the top curl forming station TT3 and as shown in FIGS. 7A, 7B and 7C is completed as follows:

First, the upper sidewall SWU of the container shell CS protrudes above the upper surface, and an annular tooling cavity TC1 defined therein, of a lower tooling ring LTR mounted on the upper surface of the top curl pot TP;

Second, this protrusion of the upper sidewall SWU is coaxially aligned with an upper curling iron UC1 which has a second annular tooling cavity TC2 formed in the lower surface thereof in opposing registry with the lower tooling ring TR1. When the said upper curling iron UC1 and the said lower tooling ring LIR are juxtaposed, the combined cross-sections of the upper and lower tooling cavities TC2 and TC1 define the cross sectional shape of the top curl TC of the ultimate container.

Third, the upper curling iron UC1 is lowered from the position in FIG. 7A through the stages illustrated in FIG. 7B to commence curling the upper sidewall into an intermediate top curl TCA and thence progresses to form a final top curl TC when the upper iron UC1 is juxtaposed with the lower ring LTR by the combined shape of the said tooling cavities TC1 and TC2.

Figure 8:
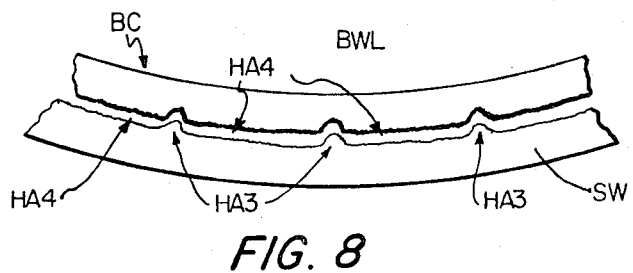
FIG. 8 is an enlarged detail of a bottom curl seam of the present invention in cross-section.
Figure 8A:
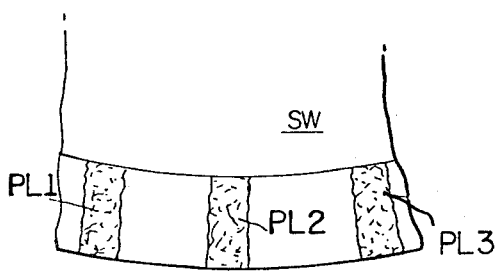
FIG. 8A is another enlarged detail of FIG. 8 in plan view.

Referring now to FIGS. 8 and 8A which are taken along the respective cross sectional lines 8—8 and 8A—8A of FIG. 4D, the nature of the filled thermoplastic sheet material utilized in the present invention in producting a novel and highly cohesive seam structure in the bottom curl BC is illustrated as to its novel details.

For example, in FIG. 8 the inside lip BWL is shown as being joined to the sidewall SW in the bottom curl structure BC by means of apparently welded areas coincident with the softened areas HA3 in the sidewall SW with the particular illustration shown being a result of separating the portions BWL and the sidewall SW in the vicinity of the bottom curl BC. Intermediate the welded areas coinciding with the softened points HA3 are other areas HA4 which have a lesser degree of cohesion but which are none the less coherent since they exist in a softened state between the more highly heated areas HA3 which appear as localized blips or circles hereinbefore described.

By the same token, the material of the sidewall SW (as well as that of the bottom wall BW and bottom wall lip BWL) is flowable as well as thermoformable due to its unique characteristics and the small pleats or similar configurations to pleats which result in curling the bottom portion of the sidewall SW in upon itself and around the lip BWL of the bottom curl BC are caused to flow and compress by the action of the various bottom curl forming tools on the turret 20 such that when the bottom curl is unfolded, as shown in FIG. 8A to illustrate the internal surface of the sidewall, such pleats are illustrated as filled crevices or patterns PL1, PL2 and PL3 which actually constitute solidified thickened portions where normally pleats would have appeared in a paper or cardboard container. There are no unfilled pleats in the bottom curl or in the side seam but all irregularities are caused to flow and fill thereby providing a more homogeneous and liquid tight seaming structure and container.

As can be seen from the foregoing specification and drawings, the present invention provides new and novel seam and container structures and methods and apparatus for manufacturing same.

It should be understood that the method and apparatus of the present invention may be modified as would occur to one of ordinary skill in the art without departing from the spirit and scope of the present invention.

It is claimed:

1. The method of forming a liquid tight and substantially undistorted seam in a thermoplastic sheet material including dispersed inorganic filler on the order of 30% to 50% by weight of the sheet material, comprising the steps of:

heating opposing faces of the opposed areas to be joined at a seam in substantially similar patterns of discrete heat softened and fusible areas, thereby creating interspersed areas softened to a lesser degree; and clamping said opposed areas together over substantially the entire area of the seam.

2. The method of claim 1, wherein said heating of said discrete areas is comprised of directing discrete jets of heated air equal in number to said discrete areas onto said opposed areas in said patterns.

3. The method of forming a liquid tight two-piece container from thermoplastic sheet material, including dispersed inorganic filler on the order of 30% to 50% by weight of the sheet material, said container including a sidewall comprised of an arcuate blank and a bottom disc joined in a sidewall seam and a bottom curl configuration having opposed lapped areas, comprising the steps of:

heating opposed seam and bottom curl defining areas of said sidewall blank in substantially similar patterns of discrete heat softened and fusible areas, thereby creating interspersed areas in said surfaces softened to a lesser degree;

wrapping said sidewall blank about a mandrel shaped to define a container sidewall and overlapping the opposed areas defining said side seam to juxtapose said patterns of discrete areas;

clamping said seam defining areas together to fuse said discrete and interspersed areas in a liquid tight seam;

said sidewall being overlapped at one end of said mandrel to expose said discrete areas on said bottom curl defining area thereof;

heating said bottom curl defining area of said bottom disc to define a pattern of discrete heat softened and fusible areas and interspersed areas of lesser softness thereon;

juxtaposing said bottom curl defining areas and said patterns of discrete areas therein of said bottom disc and said sidewall; and forming said bottom curl defining areas into a bottom curl configuration to fuse said discrete and interspersed areas thereon into a liquid tight structure.

4. The method of claim 3, wherein said heating of said discrete areas is comprised of directing discrete jets of heated air equal in number to said discrete areas onto said opposed areas in said patterns.

5. The method of claim 3, including the step of lubricating at least that portion of the sidewall seam extending beyond said mandrel prior to forming said bottom curl configuration.

6. The method of claim 5, wherein said heating of said discrete areas is comprised of directing discrete jets of heated air equal in number to said discrete areas onto said opposed areas in said patterns.

7. The method of claim 3, including the further step of heating the open rim of said sidewall opposite said bottom curl; and forming said rim into a top curl configuration.

8. The method of claim 7, including the further step of lubricating said open rim of said sidewall internally thereof prior to forming said rim into a top curl configuration.

9. The method of claim 8, including the step of lubricating at least that portion of the sidewall seam extending beyond said mandrel prior to forming said bottom curl configuration.

10. The method of claim 7, including the step of lubricating at least that portion of the sidewall seam extending beyond said mandrel prior to forming said bottom curl configuration.

11. The method of claim 7, wherein said heating of said discrete areas is comprised of directing discrete jets of heated air equal in number to said discrete areas onto said opposed areas in said patterns.

12. The method of claim 11, including the further step of lubricating said open rim of said sidewall internally thereof prior to forming said rim into a top curl configuration.

13. The method of claim 12, including the step of lubricating at least that portion of the sidewall seam extending beyond said mandrel prior to forming said bottom curl configuration.

14. The method of claim 13, including the step of lubricating at least that portion of the sidewall seam extending beyond said mandrel prior to forming said bottom curl configuration.

* * * * *